United States Patent
Suzuki et al.

(10) Patent No.: US 8,100,026 B2
(45) Date of Patent: Jan. 24, 2012

(54) PLASTIC INJECTION-MOLDED GEAR

(75) Inventors: Yasuhiro Suzuki, Kawaguchi (JP); Issei Sato, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/805,168

(22) Filed: May 21, 2007

(65) Prior Publication Data

US 2007/0283777 A1    Dec. 13, 2007

(30) Foreign Application Priority Data

Jun. 7, 2006  (JP) ................................. 2006-158511
Aug. 1, 2006  (JP) ................................. 2006-209788

(51) Int. Cl.
    *F16H 55/17*    (2006.01)
(52) U.S. Cl. ..................................... 74/434; 74/DIG. 10
(58) Field of Classification Search .............. 74/DIG. 10, 74/431, 434, 439, 460, 461, 462, 443; *F16H 55/06*
    See application file for complete search history.

(56) References Cited

U.S. PATENT DOCUMENTS

| | | | | |
|---|---|---|---|---|
| 4,781,879 | A * | 11/1988 | Oishi | 264/328.12 |
| 6,449,845 | B1 * | 9/2002 | Specht et al. | 29/892.2 |
| 6,622,814 | B2 * | 9/2003 | Kurokawa et al. | 180/444 |
| 6,813,971 | B2 * | 11/2004 | Hagiwara | 74/431 |
| 2002/0029649 | A1 * | 3/2002 | Bauseler | 74/462 |
| 2004/0187622 | A1 * | 9/2004 | Noguchi et al. | 74/431 |
| 2004/0241276 | A1 * | 12/2004 | Miyasaka | 425/543 |

FOREIGN PATENT DOCUMENTS

| | | | |
|---|---|---|---|
| JP | 2-91585 | | 4/1992 |
| JP | 6-78650 | | 11/1994 |
| JP | 2001289311 | A * | 10/2001 |
| JP | 2004116646 | A * | 4/2004 |
| JP | 2006070915 | A * | 3/2006 |
| JP | 2006220176 | A * | 8/2006 |

* cited by examiner

Primary Examiner — Thomas R Hannon
Assistant Examiner — Alan Waits
(74) Attorney, Agent, or Firm — DLA Piper LLP (US)

(57) ABSTRACT

A plastic injection-molded gear that can prevent the occurrence of noise during meshing attributed to molten-liquid-induced creases, suppress deformations on a rim and a web, and suppress displacement of a meshing position is provided. A rim, on which teeth are formed, is supported by a first overhanging section, a second overhanging section, and radial direction ribs. The first overhanging section projects in a cantilevered manner from an outer peripheral edge of a web. The second overhanging section extends in an outward radial direction from a tip side of the first overhanging section. The radial direction ribs are formed straddling the first overhanging section and the second overhanging section. A connecting section between the rim and the second overhanging section is displaced from a meshing position of the teeth in a teeth width direction. The radial direction ribs are disposed in multiple numbers along the outer periphery of the first overhanging section, dividing a ring-shaped space between the first overhanging section and the rim into a plurality of small spaces (lightening sections).

4 Claims, 12 Drawing Sheets

Prior Art

PLASTIC INJECTION-MOLDED GEAR

BACKGROUND OF THE INVENTION

1. Field of the Invention

The present invention relates to a plastic injection-molded gear used in power transmission devices, such as various automobile components, industrial machinery, and precision machinery.

2. Description of the Related Art

Since the past, plastic injection-molded gears have been widely used in power transmission devices, such as various components of automobiles and industrial machineries. The plastic injection-molded gear is lighter and has quieter work noise than a metal gear.

Among plastic injection-molded gears such as those described above, FIG. 12 and FIG. 13 show a plastic injection-molded gear 200 forming a reduction gear. In the plastic injection-molded gear 200 shown in the diagrams, a rim 202 is formed in a cantilevered manner on an outer peripheral edge of a web 203. Teeth 201 are formed on an outer periphery of the rim 202. A rubber 205 is housed within a ring-shaped recess (space) 204 formed between an inner peripheral side of the rim 202 and a side surface of the web 203. A pressing component 206 is disposed on a side surface of the rubber 205. Impact that takes effect when rotation is started and when rotation is stopped is absorbed by a damper means 207, including the rubber 205 and the pressing component 206 (refer to Patent Literature 1 and Patent Literature 2).

Patent Literature 1: Microfilm of Utility Model Application No. Heisei 2-91585 (Utility Model Laid-open Publication No. Heisei 4-51056) (see FIG. 1 and FIG. 2, in particular)

Patent Literature 2: Utility Model Laid-open Publication No. Heisei 6-78650 (see FIG. 1, in particular)

SUMMARY OF THE INVENTION

However, in the plastic injection-molded gear 200 as described above, the rim 202 on which the teeth 201 are formed is cantilevered. Therefore, when a position at which the teeth 201 mesh with a mating gear (for example, a worm) is displaced from a connection position between the web 203 and the rim 202, distortion deformation occurs in the rim 202, influenced by the load placed on the meshing position of the teeth 201, as shown in FIG. 14C. The origin of the distortion deformation is a connecting section between the rim 202 and the web 203. In addition, the web 203 itself curves and becomes deformed as a result of a bending moment affecting the connecting section connecting the web 203 with the rim 202. Alternatively, creep deformation of the rim 202 easily occurs. As a result, smooth power transmission may be difficult.

To solve such insufficiency in the strength of the plastic injection-molded gear 200, a following countermeasure is taken. As shown in FIG. 14A, the side surface of the web 203 and the inner peripheral surface of the rim 202 are connected by ribs 208, thereby reinforcing the strengths of the rim 202 and the web 203. A rib 208 is similar to a bracing member and is disposed in multiple numbers, along the inner peripheral surface of the rim 202 in a circumferential direction. However, the deformation of the rim 202 and the displacement of the meshing position P of the teeth 201 cannot be reduced to a satisfactory degree. When the thicknesses of the web 203 and the rim 202 are increased to enhance the strengths, a new problem may occur in the plastic injection-molded gear 200, such as an occurrence of a void. Furthermore, as a result of relationships with other components disposed adjacent to the side surface of the web 203 (for example, the damper means 207), the countermeasure in which the thicknesses of the web 203 and the rim 202 are increased to reinforce the web 203 and the rim 202 cannot be taken.

To solve the insufficiency in the strength of the plastic injection-molded gear 200, a following countermeasure is taken. As shown in FIG. 14B, the connection position between the web 203 and the rim 202 is positioned to match the meshing position P of the teeth, so that the distortion deformation does not occur in the rim 202. As a result, the deformation of the rim 202 and the displacement of the meshing position P of the teeth can be reduced to a satisfactory degree. However, molten-liquid-induced creases (stripe-shaped unevenness) occur at the meshing position P of the teeth and its vicinity (F1). A new problem occurs in that noise attributed to the molten-liquid-induced creases increases.

Therefore, an object of the present invention is to provide a plastic injection-molded gear that can, in addition to preventing the occurrence of the noise attributed to the molten-liquid-induced creases, suppress the deformations (the distortion deformation and the creep deformation) of the rim and the web and suppress the displacement of the meshing position.

The invention is a plastic injection-molded gear in which a rim is disposed on an outer peripheral side of a web. Teeth are formed on the rim. The plastic injection-molded gear of the present invention includes (1) a first overhanging section formed so as to project toward one side surface of an outer peripheral edge of the web in a cantilevered manner and roughly shaped into a ring with a central axis of rotation as the center, (2) a second overhanging section extending from a tip of the first overhanging section on the projection side in an outward radial direction of the web, (3) the rim on which the teeth are formed on the outer periphery, extending from the outward radial direction edge of the second overhanging section in a direction opposite of the projection direction of the first overhanging section and having a roughly ring-shaped portion that is a concentric circle with the first overhanging section, and (4) a plurality of radial direction ribs connecting the outer periphery of the first overhanging section and the inner periphery of the rim in a radial direction, so as to divide a roughly ring-shaped space surrounded by the first overhanging section, the second overhanging section, and the rim into a plurality of small spaces along the first overhanging section in the outer circumferential direction. The connection position between the second overhanging section and the rim is in a position displaced from the meshing position of the teeth in a teeth width direction. The thicknesses of the web, the first overhanging section, and the second overhanging section are almost the same. In addition, the thickness of the radial direction rib is thinner than the thickness of the web, so as to narrow the flow of resin moving from the web in the outward radial direction during injection molding and preferentially lead the flow of the resin from the web to the first overhanging section side.

The invention is further a plastic injection-molded gear in which the thickness of a corner section serving as a connecting section between the first overhanging section and the second overhanging section is almost the same as the thicknesses of the first overhanging section and the second overhanging section.

The invention is still further a plastic injection-molded gear according to claim 1, in which a corner section serving as a connection section between the first overhanging section and the second overhanging section is formed into a circular arc.

The invention is also a plastic injection-molded gear according to claim 1, in which a corner section serving as a connection section between the first overhanging section and the second overhanging section is formed into a circular arc of which the thickness is almost the same as the thicknesses of the first overhanging section and the second overhanging section.

EFFECT OF THE INVENTION

According to the present invention, molten-liquid-induced creases caused by stagnation in the flow of molten resin during injection molding do not occur at the meshing position of the teeth on the rim and in the vicinity of the meshing position. The occurrence of noise during meshing (during power transmission) attributed to the molten-liquid-induced creases can be prevented.

In addition, according to the present invention, the rim is supported by the first overhanging section, the second overhanging section, and the radial direction ribs. Therefore, the rigidity of the supporting section of the rim is enhanced. The distortion deformations and the creep deformations of the rim and the web can be suppressed, and the displacement of the meshing position can be suppressed.

BRIEF DESCRIPTION OF THE DRAWINGS

FIG. 10A is a front view of the worm wheel;

FIG. 10B is an enlarged view of a portion of FIG. 10A;

DETAILED DESCRIPTION OF THE PREFERRED EMBODIMENT

Embodiments of the present invention will be described in detail, with reference to the drawings.

Figure 1:
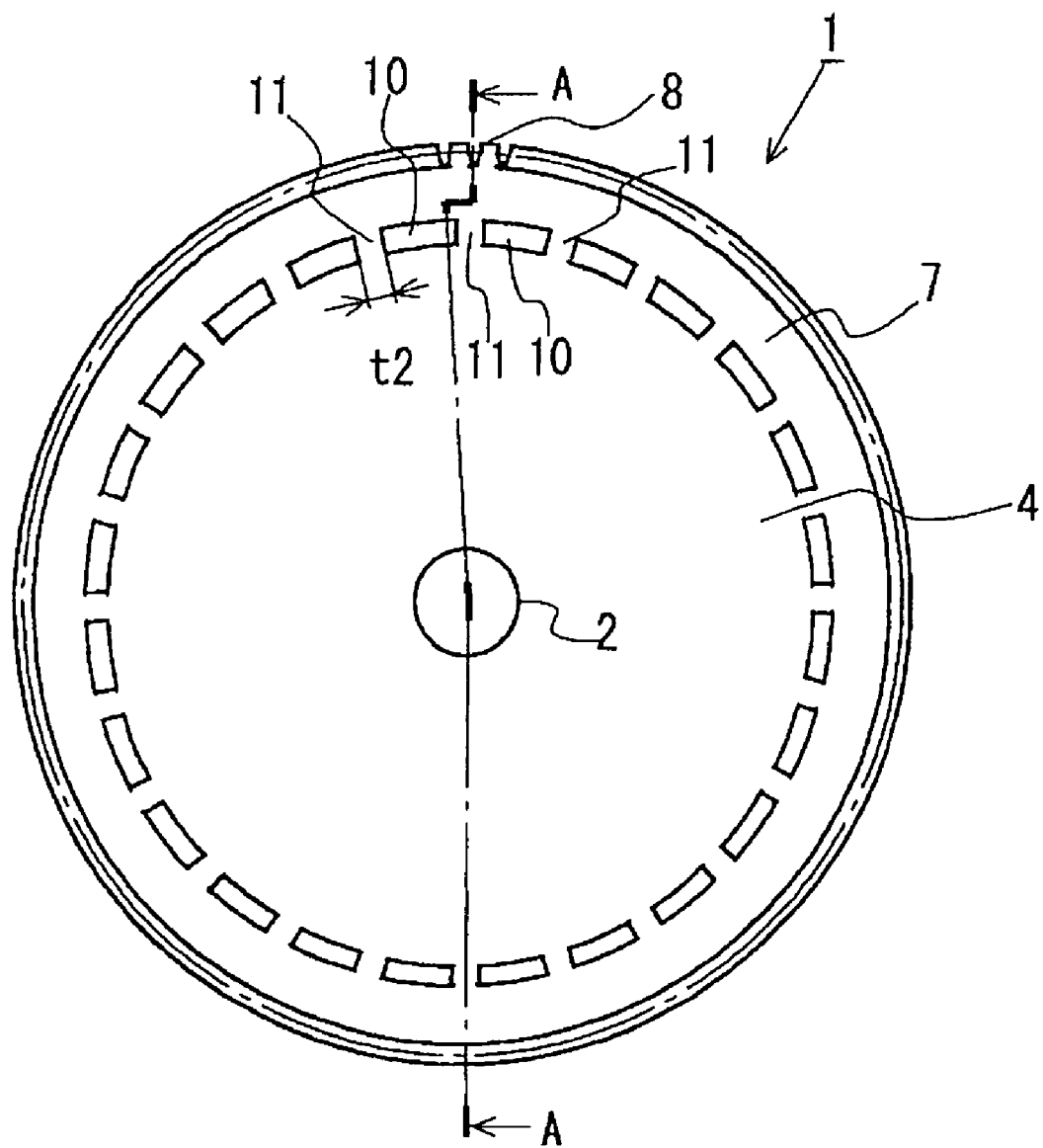
FIG. 1 is a front view of a worm wheel serving as a plastic injection-molded gear according to an embodiment of the present invention.
Figure 2:
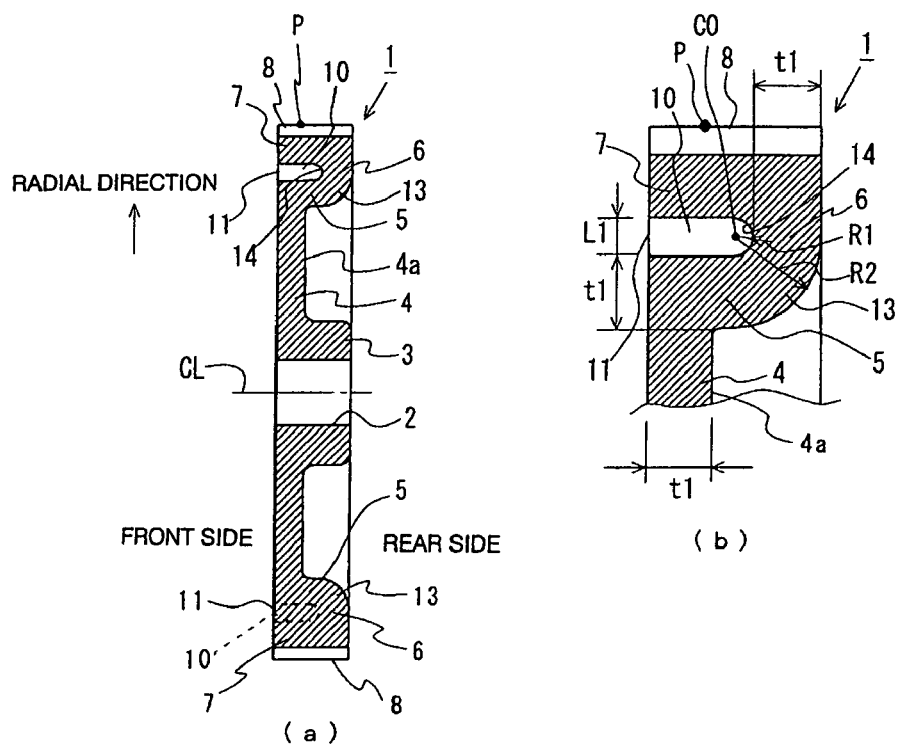
FIG. 2A is a cross-sectional view of the worm wheel taken along line A-A in FIG. 1.
FIG. 2B is an enlarged view of a portion of FIG. 2A.
Figure 3:
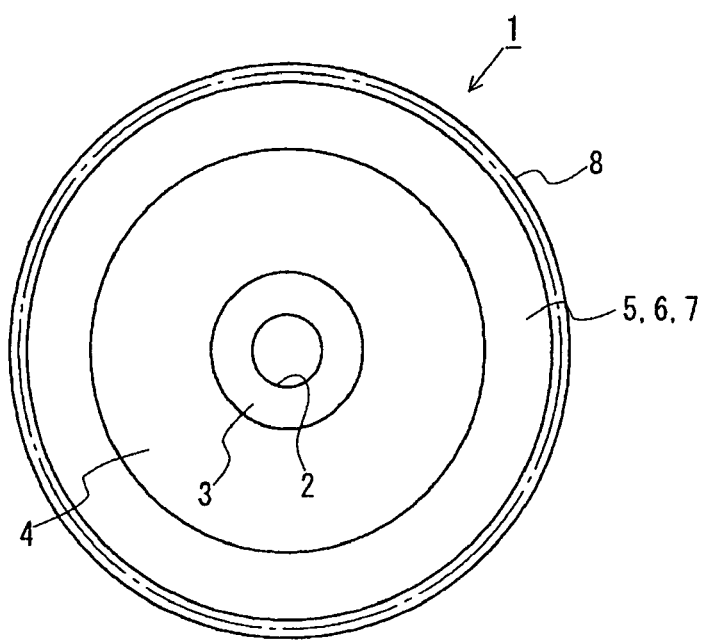
FIG. 3 is a rear view of the worm wheel.
Figure 4:
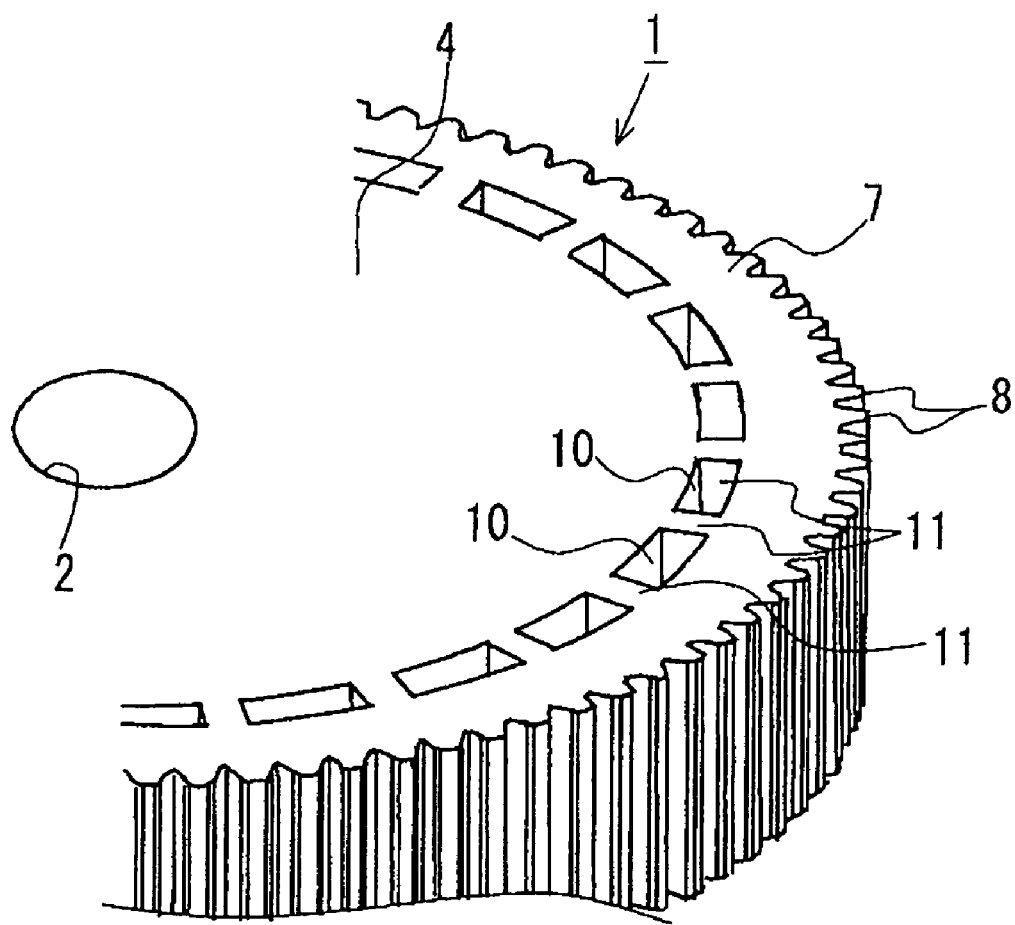
FIG. 4 is a perspective view of a portion of the worm wheel according to the present embodiment, viewed from a front side.

FIG. 1 to FIG. 4 show a worm wheel 1 serving as a plastic injection-molded gear according to an embodiment of the present invention. Among the diagrams, FIG. 1 is a front view of the worm wheel 1. FIG. 2A is a cross-sectional view of the worm wheel 1 taken along a line A-A in FIG. 1. FIG. 2B is an enlarged view of a portion of FIG. 2A (a partially enlarged cross-sectional diagram of the worm wheel). FIG. 3 is a rear view of the worm wheel 1. FIG. 4 is a perspective view of a portion of the worm wheel 1, viewed from a front side.

The worm wheel 1 according to the present embodiment, shown in the above-mentioned diagrams, is formed by polyacetal, polyamide, polyphenylene sulfide, polybutylene terephthalate, or the like being injection-molded. In the worm wheel 1, a disc-shaped web 4 is integrally formed on one edge side of a boss section 3 in the radial direction, so that the thickness of the web 4 is almost the same. The web 4 extends in an outward radial direction. An axis hole 2A is formed in the boss section 3. A roughly ring-shaped first overhanging section 5 is formed on an outward edge of the web 4 in the radial direction (outer peripheral edge). The first overhanging section 5 projects toward a one side surface 4a side (the direction along a central axis of rotation CL) of the web 4 in a cantilevered manner. A second overhanging section 6 is integrally formed on the tip of the first overhanging section 5 on the projecting side. The second overhanging section 6 extends in the outward radial direction. A roughly ring-shaped rim 7 is integrally formed on an outward edge of the second overhanging section 6 in the radial direction. The rim 7 extends toward a direction opposite of the projection direction of the first overhanging section 5. In other words, the first overhanging section 5, the second overhanging side 6, and the rim 7 are formed into a shape similar to a cylindrical component folded back toward the outer side. Teeth 8 that mesh with a partner gear (a worm according to the present embodiment; not shown) are formed on the outer periphery of the rim 7. As shown in FIG. 1B, a meshing position P of the worm wheel 1 and the worm (not shown) is disposed to be sufficiently displaced in the teeth width direction from a connecting section between the second overhanging section 6 and the rim 7.

The first overhanging section 5 and the rim 7 are roughly ring-shaped sections concentrically positioned with the central axis of rotation CL as the center. The first overhanging section 5 and the rim 7 are positioned separated by a length of the second overhanging section 6 in the radial direction (L1). A plurality of radial direction ribs 11 are formed on the outer periphery of the first overhanging section 5 equally spaced in the circumferential direction. The radial direction ribs 11 divide a ring-shaped space formed between the first overhanging section 5, the second overhanging section 6, and the rim 7 into a plurality of small spaces (lightening sections) 10 along the circumferential direction and connect the outer periphery of the first overhanging section 5 and the inner periphery of the rim 7 in the radial direction.

Figure 5:
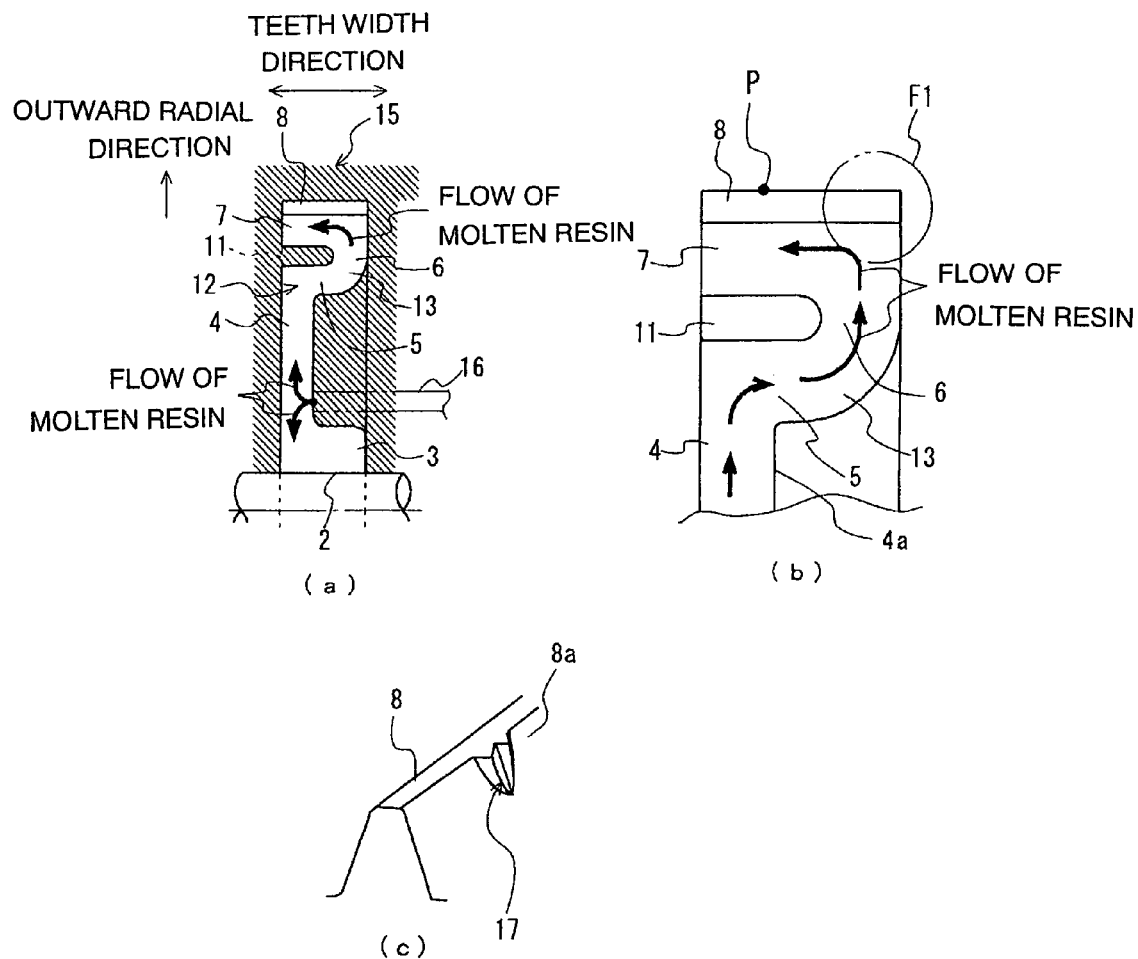
FIG. 5A is a diagram schematically showing a shape of a cavity in an injection-molding mold and a flow of molten resin within the cavity.
FIG. 5B is a diagram schematically explaining a flow of molten resin during injection molding (during worm wheel formation)
FIG. 5C is a diagram of a molten-liquid-induced crease occurring on a teeth surface, attributed to stagnation of the flow of molten resin within the cavity.
Figure 6:
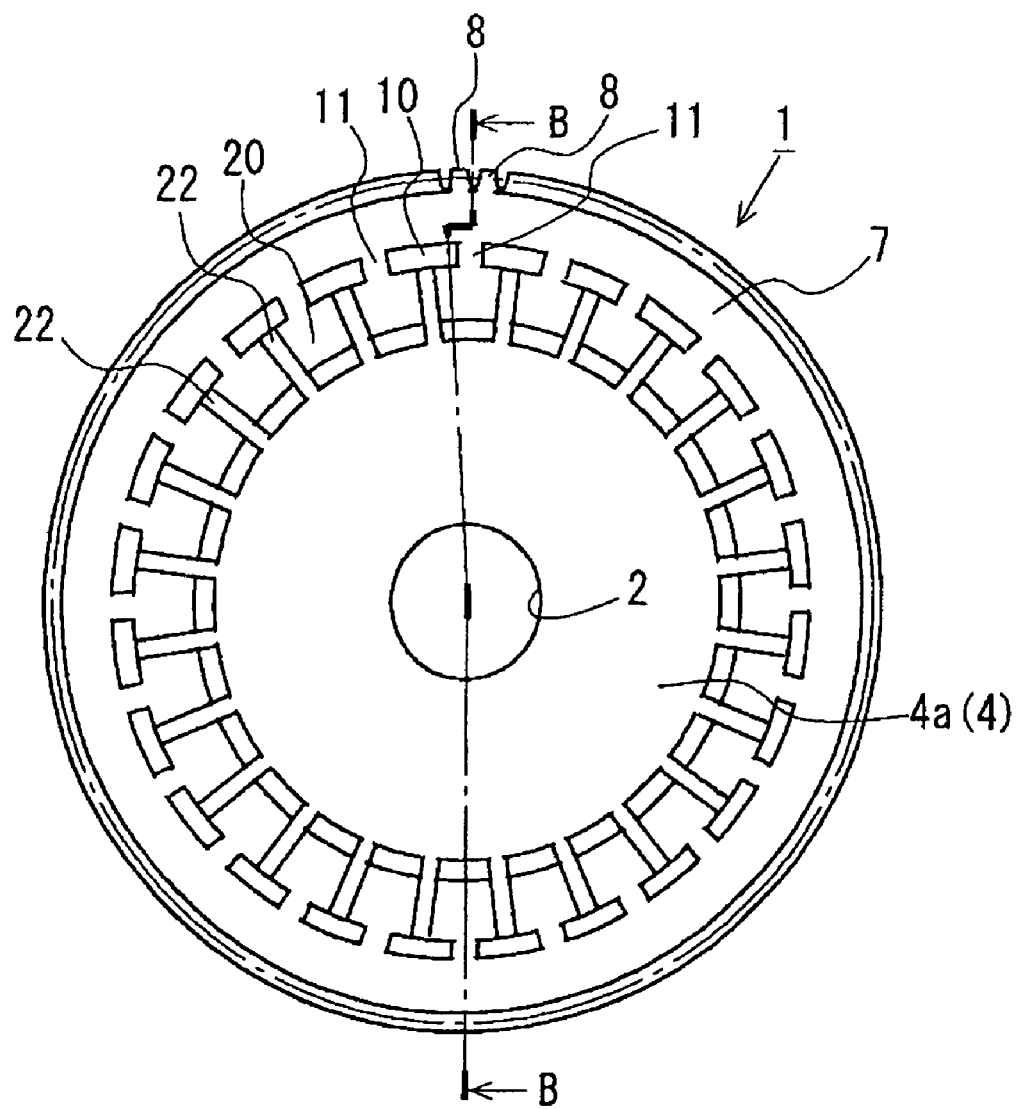
FIG. 6 is a front view of a worm wheel serving as a plastic injection-molded gear according to a variation example of the present invention.
Figure 7:
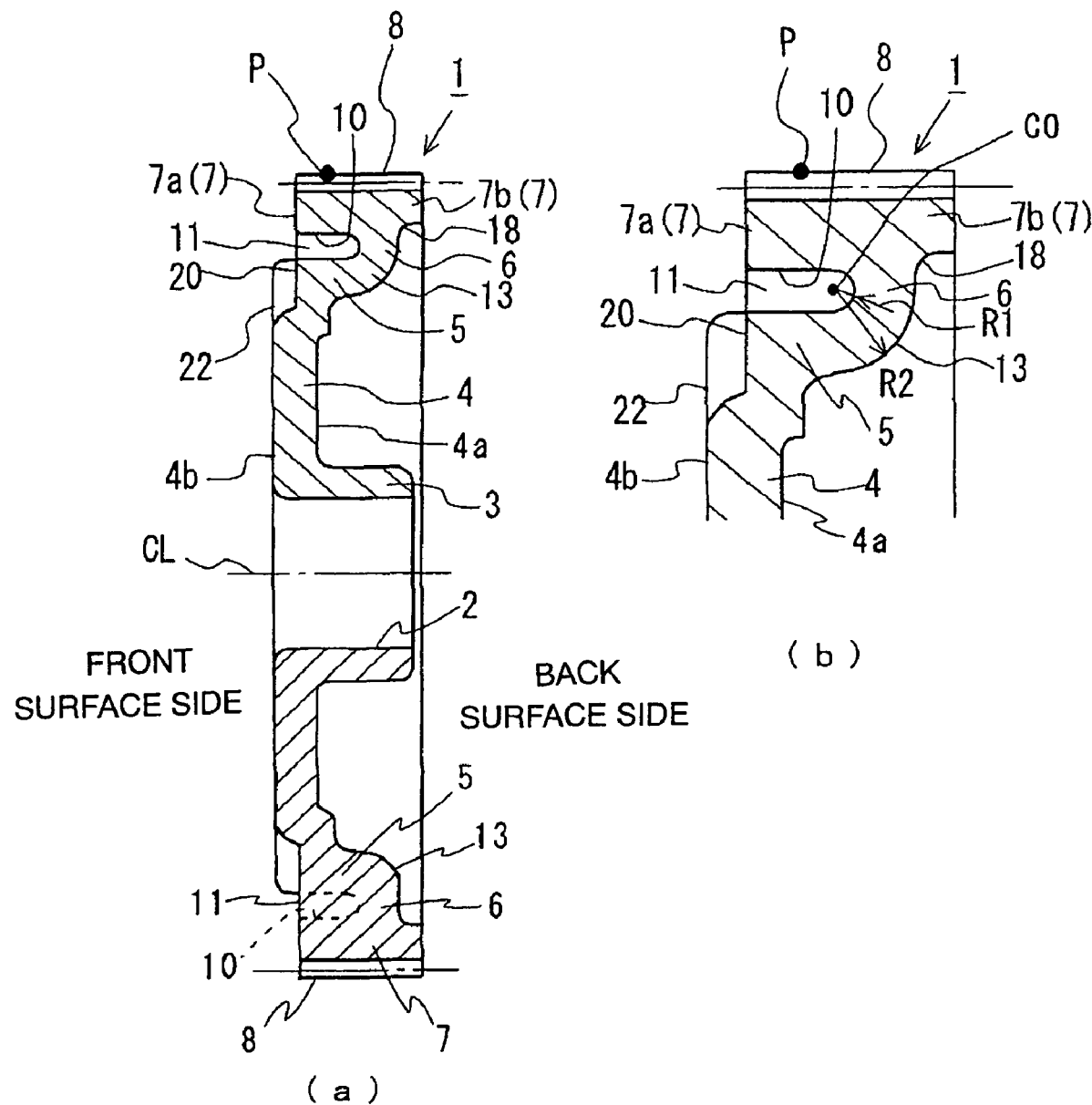
FIG. 7A is a cross-sectional view of the worm wheel taken along line B-B in FIG. 6.
FIG. 7B is an enlarged view of a portion of FIG. 7A.
Figure 8:
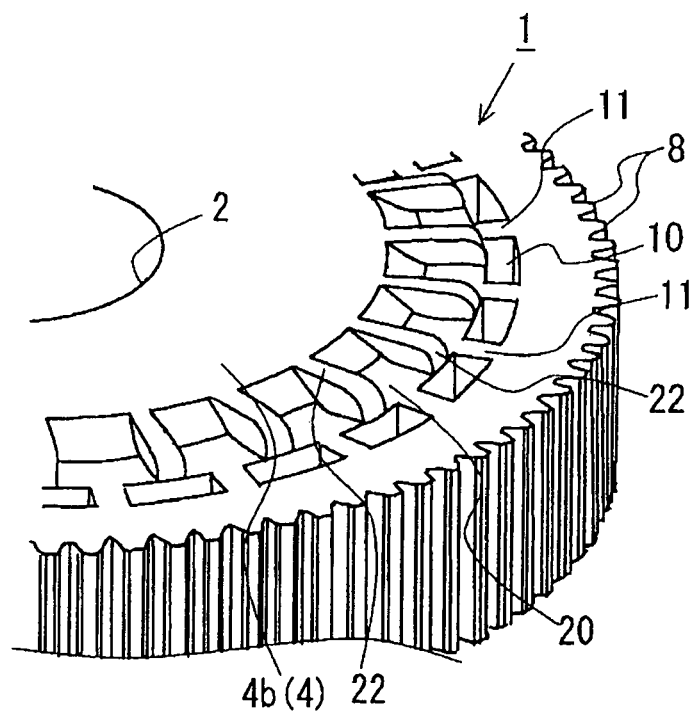
FIG. 8 is a perspective view of a portion of the worm wheel according to the present variation example, viewed from a front side.

The web 4, the first overhanging section 5, and the second overhanging section 6 are formed having almost the same thickness, t1. At the same time, a thickness t2 of the radial direction ribs 11 is thinner than the thicknesses of the web 4, the first overhanging section 5, and the second overhanging section 6. For example, in the worm wheel 1 according to the present embodiment, when the thickness t1 of the web 4, the first overhanging section 5, and the second overhanging section 6 is 3.5 mm, the thickness t2 of the radial direction ribs 11 is almost 1.5 mm. As a result of the thickness t2 of the radial direction rib 11 being thinner than the thickness t1 of the web 4 and the first overhanging section 5, the flow of molten resin during injection molding can be preferentially led from the web 4 to the first overhanging section 5 side. The flow of molten resin from the web 4 to the rim 7 side, via the radial direction ribs 11, can be obstructed, and the occurrence of molten-liquid-induced creases near the meshing position P can be prevented. In addition, as a result of the thickness t2 of the radial direction ribs 11 being thinner than the thickness t1 of the web 4 and the first overhanging section 5, the flow of molten resin within a cavity 12 can be restricted so that sections within the cavity 12 corresponding with the rim 7 and the teeth 8 can be equally filled with the molten resin (see FIG. 5A). The thickness t2 of the radial direction ribs 11 is not limited to the numerical example given above, as long as the flow of molten resin can be restricted as described above. In addition, the numerical example of the thickness t1 of the web 4 and the like is provided to facilitate understanding of the present embodiment. The thickness t1 is not limited to the numerical example given above. The thickness t1 of the second overhanging section 6 corresponds with the section in the cross-section in FIG. 2B having the thinnest thickness.

In the corner section 13, serving as the connecting section between the first overhanging section 5 and the second overhanging section 6, the outer surface side and the inner surface side are formed into circular arcs (R1 and R2), as shown in the cross-sectional view in FIG. 2B. The circular arcs (R1 and R2) appear to be portions cut out from concentric circles of which CO is the center. The corner section 13 has the thickness t1 that is almost the same as the thicknesses of the first overhanging section 5 and the second overhanging section 6. As a result, in the corner section 13 of the first overhanging section 5 and the second overhanging section 6, a shape-effect due to the circular arc shape of the corner section 13 (an effect by which the flow of molten resin is not disturbed) and an effect by which the thickness remaining unchanged (an effect by which the flowing speed of molten resin is unchanged) are combined, and the flow of molten resin flowing from the web 4 to the rim 7 side, via the first overhanging section 5 and the second overhanging section 6, can be smoothened. Furthermore, as a result of the corner section 13 being shaped into the circular arc, the rigidity of the corner section 13 is increased and the corner section 13 becomes more resistant against strain. Therefore, the durability of the corner section 13 is enhanced. According to the present embodiment, a connecting section 14 between the second overhanging section 6 and the rim 7 is configured so that connection can be made with smooth curved surfaces. The connecting section 14 is designed so that the molten resin flows smoothly from the second overhanging section 6 to the rim 7 (see FIG. 2A).

FIG. 5A is a diagram showing a shape of the cavity 12 formed within a mold 15 of the worm wheel 1 according to the present embodiment and schematically showing the flow of molten resin within the cavity 12. As shown in the diagram, a gate 16 is opened in the cavity 12 within the mold 15 used in injection molding. The gate 16 is used to lead the molten resin to an inward edge side of the section forming the web 4 in the radial direction (a side of a position near the section forming the boss section 3). The resin emitted from the gate 16 flows toward the boss 3 side and the outward side of the web 4 in the radial direction. Within the cavity 12, the section corresponding with the radial direction ribs 11, straddling and connected to the first overhanging section 5, the second overhanging section 6, and the rim 7, is shaped so as to suddenly narrow the flow of molten resin. Therefore, the molten resin that has reached the outward edge side of the section forming the web 4 in the radial direction does not easily flow into the section forming the radial direction ribs 11. The molten resin is preferentially led toward the section forming the first overhanging section 5, having a smaller flow resistance that the section forming the radial direction ribs 11. The molten resin first flows into the section forming the first overhanging section 5. The molten resin that has flowed into the section forming the first overhanging section 5 within the cavity 12 sequentially flows to the sections forming the corner section 13 and the second overhanging section 6. Subsequently, the molten resin flows into the sections forming the rim 7 and the teeth 8. The molten resin flows from one edge of the section forming the roughly cylindrical rim 7 (one edge in the teeth width direction that is the edge on the second overhanging section 6 side) to the other edge (other edge in the teeth width direction). After the molten resin positioned in the sections forming the web 4, the first overhanging section 5, the corner section 13, and the second overhanging section 6 flows into the section forming the radial direction ribs 11, the molten resin flows toward the side of the section forming the rim 7. The position of the gate 16 is not limited to the above-described configuration. For example, the gate 16 can be provided on the edge surface of the boss section 3.

According to the present embodiment configured in this way, even when stagnation occurs in the flow of molten resin in the section within the rim 7 that is directly above the second overhanging section 6 and its vicinity (the section indicated by F1 in FIG. 5B), the meshing position P with the mating gear (worm) and an area in which the stagnation in the flow of molten resin occurs (F1) are displaced in the teeth width direction. Therefore, the flow of molten resin at the meshing position P and its vicinity is smooth, and the stagnation in the flow of resin does not occur. As a result, in the worm wheel 1 after injection molding, even when a molten-liquid-induced crease 17 attributed to the stagnation in the flow of molten resin occurs on the surface of the teeth 8 (teeth surface 8a) in the area within the rim 7 in which the stagnation occurs (F1), the molten-liquid-induced crease 17 does not occur at the meshing position P with the mating gear (worm) and its vicinity (see FIG. 5B and FIG. 5C). The molten-liquid-induced crease 17 refers to an uneven section including a stripe-shaped recess formed on the teeth surface 8a and protrusions formed along the edges of the recess, as shown in FIG. 5C.

As described above, in the worm wheel 1 according to the present embodiment, the molten-liquid-induced crease 17 does not occur at the meshing position P with the mating gear (worm) and its vicinity. Therefore, the surface roughness of the teeth surface 8a can be improved, and the occurrence of noise attributed to the molten-liquid-induced crease 17 at the meshing position P can be prevented.

Figure 12:
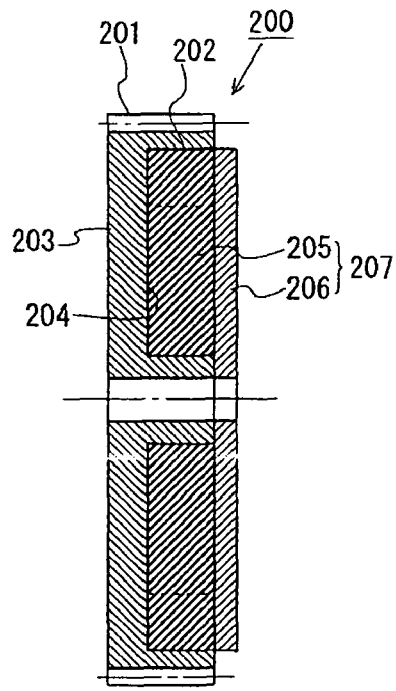
FIG. 12 is a longitudinal sectional view of a conventional plastic injection-molded gear.
Figure 13:
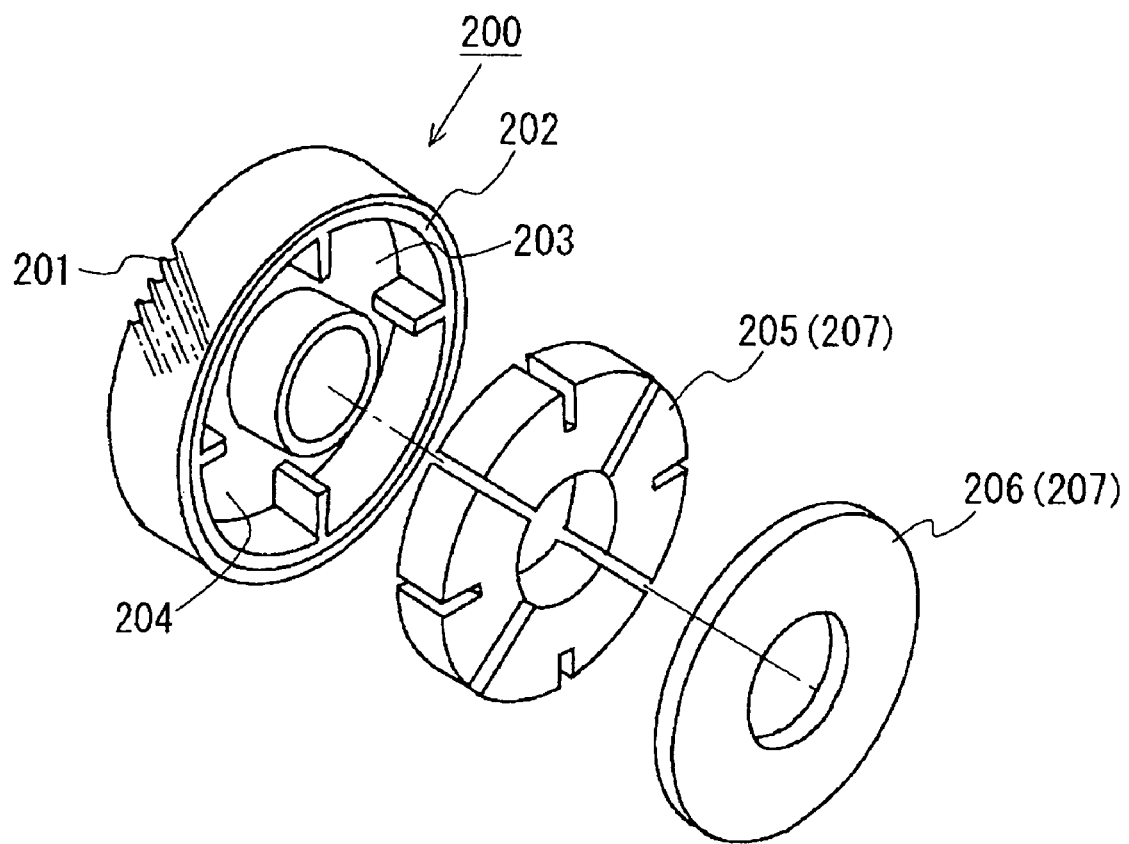
FIG. 13 is an analytical perspective view of the plastic injection-molded gear in FIG. 12.
Figure 14:
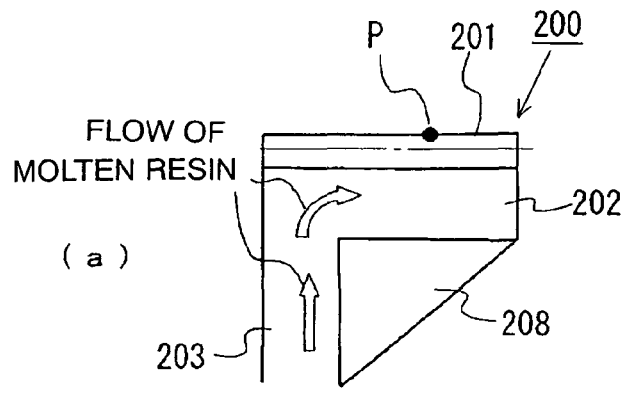
FIG. 14A is an enlarged view of a portion of the plastic injection-molded gear, showing a second conventional example.
FIG. 14B is an enlarged view of a portion of the plastic injection-molded gear, showing a third conventional example.
FIG. 14C is a schematic view of a rim and a web of the plastic injection-molded gear in a deformed state.
Figure 14:
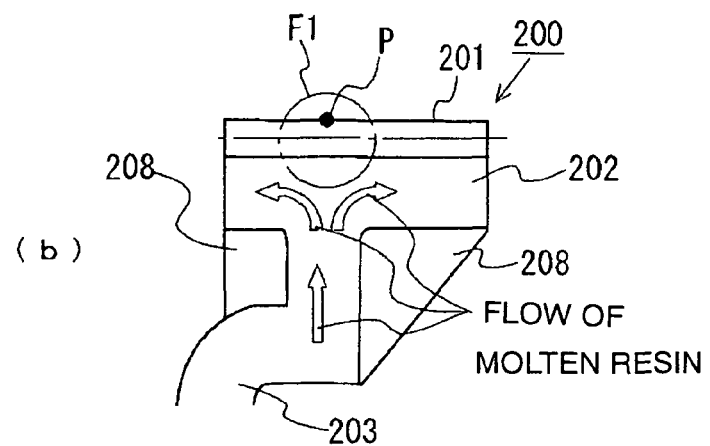
Figure 14:
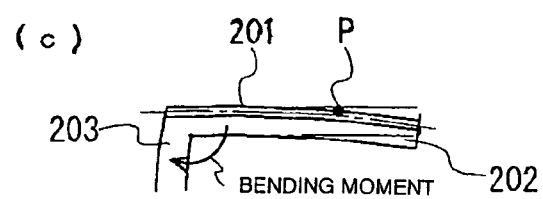

In addition, in the worm wheel 1 according to the present embodiment, the rim 7 is supported by the first overhanging section 5, the corner section 13, and the second overhanging section 6. The first overhanging section 5, the corner section 13, and the second overhanging section 6 have a thickness t1 that is almost the same as the thickness of the web 4. In addition, the rim 7 is supported by the radial direction ribs 11 formed straddling the first overhanging section 5, the corner section 13, and the second overhanging section 6. The bending rigidity of the sections supporting the rim 7 is larger that that of conventional resin gears (see FIG. 12 and FIG. 14). Therefore, the amount of distortion deformation and the amount of creep deformation of the rim 7 influenced by the meshing load during power transmission can be reduced, and the reduction in gear teeth accuracy can be suppressed. As a result, in the worm wheel 1 according to the present embodiment, a smooth and high-accuracy power transmission can be achieved.

As described above, in the worm wheel 1 according to the present embodiment, the deterioration of the surface roughness of the teeth surface 8a attributed to the molten-liquid-induced crease 17 can be prevented, and the reduction in durability attributed to roughening of the teeth surface 8a can be prevented. Moreover, the creep deformation can be suppressed. Therefore, the durability can be enhanced compared to the conventional resin gears.

Figure 15:
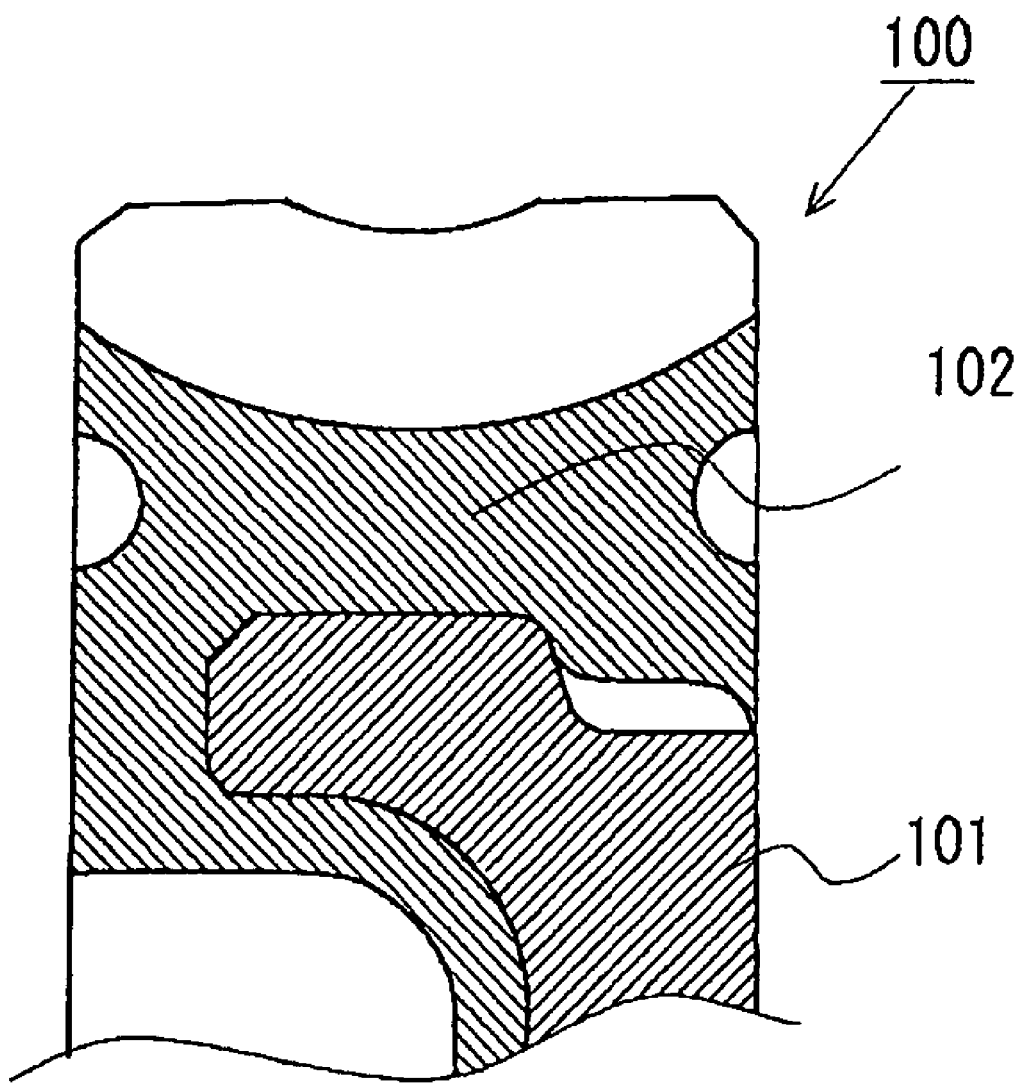
FIG. 15 is a partial cross-sectional diagram of a worm wheel that is a comparison example of the present invention.

As shown in FIG. 15, a worm wheel disclosed in Japanese Patent Laid-open Application No. 2003-139220 is known as a worm wheel 100 appearing, at a glance, to have a similar cross-sectional shape. However, in the disclosed worm wheel, a metal core component 101 is insert-molded, and a resin-material rim 102 is supported by the metal core component 101. Therefore, the weight increases, and the unit price rises. Contrary to a conventional example such as this, the worm wheel 1 according to the present embodiment is formed only from resin material. As a result of the design of the structure of the sections supporting the rim 7 (the first overhanging section 5, the second overhanging section 6, and the radial direction ribs 11) and the restriction of the flow of molten resin, the strength can be enhanced despite the worm wheel 1 being light in weight. Furthermore, the unit price can be kept low.

Although an example of the worm wheel 1 according to the present embodiment is given, in which the boss section 3 including an axis hole 2 is formed in the rotational center portion of the web 4, a section serving as the rotation axis can be integrally formed in the rotational center portion of the web 4, in place of the boss section 3.

First Variation Example

FIG. 6 to FIG. 9 show variation examples of the worm wheel 1 shown in FIG. 1 to FIG. 4. The basic configuration of a worm wheel 1 of the present variation example is the same as that according to the above-describe embodiment. Therefore, constituent elements that are shared with the above-described embodiment are given the same reference numerals. Explanations that are redundant with the explanation of the above-described embodiment will be omitted.

A rim of the worm wheel 1 shown in FIG. 6 to FIG. 9 includes a first rim section 7a and a second rim section 7b. The first rim section 7a is a cylindrical section extending from the second overhanging section 6 side to the meshing position P side. The second rim section 7b extends slightly from the second overhanging section 6 side in the direction opposite of the first rim section 7a (the direction away from the meshing position P). The corner section 18 connecting the second rim section 7b and the second overhanging section 6 has a smooth curved surface shaped into a circular arc. The strength of the vicinity of the connecting section between the second overhanging section 6 and the rim 7, to which the bending moment takes effect, is enhanced.

Figure 9:
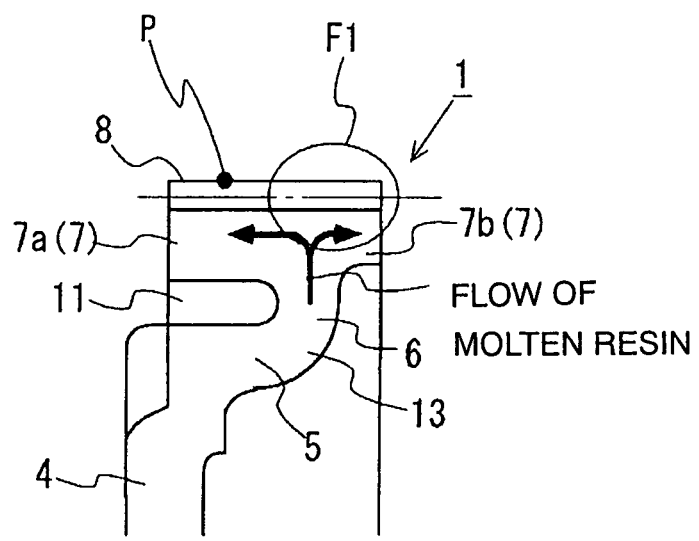
FIG. 9 is a diagram schematically explaining a flow of molten resin during injection molding, corresponding to the worm wheel shown in FIG. 7B.

In the worm wheel 1 configured in this way, the molten resin flowing from the second overhanging section 6 side to the rim 7 side branches to the first rim section 7a side and the second rim section 7b side, when flowing in from the second overhanging section 6 side to the rim 7 side, as shown in FIG. 9. The area (F1) in which the flow of molten resin from the branching section of the flow of molten resin to the second rim section 7 side stagnates easily occurs. The molten-liquid-induced crease 17 attributed to the stagnation in the flow of molten resin is formed on the surface of the teeth 8 in the area indicated by F1 (see FIG. 5C). However, the area in which the molten-liquid-induced crease 17 occurs is sufficiently separated from the meshing position P with the worm (not shown). Therefore, as in the worm wheel 1 shown in FIG. 1 to FIG. 4, the occurrence of the noise attributed to the molten-liquid-induced crease 17 can be prevented.

In addition, in the worm wheel 1 according to the present variation example, the capacity of the space formed by the boss section 3, the web 4, and the first overhanging section 5 is larger than that according to the above-described embodiment. Therefore, the web 4, from the outer periphery of the boss section 3 to the vicinity of the first overhanging section 5, projects by a predetermined amount in the direction along the central axis of rotation CL, further than the other edge side of the rim 7. Radial direction reinforcement ribs 22 are formed on the edge surface 20 of the first overhanging section 5 (the edge surface on the front surface side). The radial direction reinforcement ribs 22 connect the outer peripheral edge of the projecting section of the web 4 and the outer peripheral edge of the first overhanging section 5 in the radial direction. The radial direction reinforcement ribs 22 are formed in multiple numbers, radiating along the circumferential direction. As a result, the strength of the connecting section between the first overhanging section 5 and the web 4 increases. The displacement of the meshing position P and the deformation of the web 4, attributed to the meshing load taking effect during power transmission, can be further effectively suppressed.

The worm wheel 1 according to the present variation example, configured as described above, can achieve the same effects as the worm wheel 1 according to the above-described embodiment described with reference to FIG. 1 to FIG. 4.

In the present variation example, the outward edge sides of the radial direction reinforcement ribs 22 in the radial direction are connected to the outer peripheral edge side of the first overhanging section 5 with a smooth curved surface. The inner peripheral edge of the web 4 is connected to the boss section 3 with a smooth curved surface.

Second Variation Example

Figure 10:
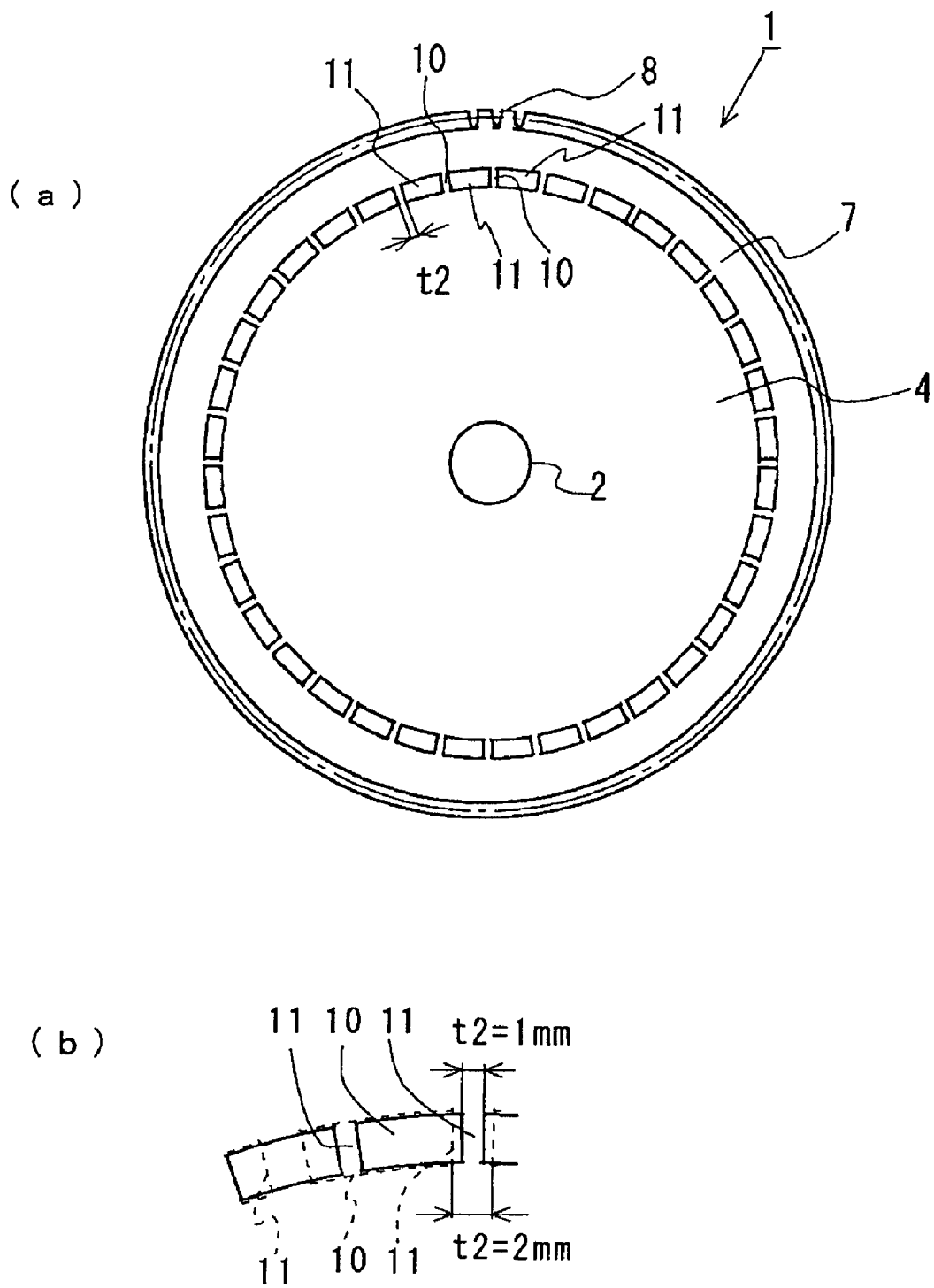
FIG. 10 shows diagrams of a worm wheel according to a second variation example.

FIG. 10 shows a variation example of the worm wheel 1 shown in FIG. 1 to FIG. 4. FIG. 10A is a front view of the worm wheel 1 corresponding to FIG. 1. FIG. 10B is an enlarged view of a portion of FIG. 10A. FIG. 10B shows a comparison of when the thickness t2 of the radial direction ribs 11 is 1 mm (solid line section) and when the thickness t2 of the radial direction ribs 11 is 2 mm (dotted line section). The basic configuration of the worm wheel 1 according to the present variation example is the same as that according to the above-described embodiment. Therefore, constituent elements that are shared with the above-described embodiment are given the same reference numerals. Explanations that are redundant with the explanation of the above-described embodiment will be omitted. The worm wheel 1 shown in FIG. 10 has the same cross-sectional shape as that in FIG. 2A. Therefore, explanations will be made citing FIG. 2 as required.

In the worm wheel 1 according to the present variation example, the ratio of the thickness t1 of the web 4 and the thickness t2 of the radial direction rib 11 is optimized. The flow of molten resin during injection-molding is preferentially led from the web 4 to the first overhanging section 5 side. The flow of molten resin flowing within the cavity 12 is restricted by the molten resin being obstructed from flowing from the web 4 to the rim 7 side, via the radial direction ribs 11. Designs are made so that a confluence of the flow of molten resin flowing through the sections within the cavity 12 corresponding with the web 4, the first overhanging section 5, the second overhanging section 6, the rim 7, and the teeth 8 and the flow of molten resin flowing through the section corresponding to the radial direction ribs 11 within the cavity 12 is not formed on the teeth 8. In addition, a design is made so that a welding mark is not formed on the teeth surface of the teeth 8 (see FIG. 2A and FIG. 5).

In other words, in the worm wheel 1 according to the present variation example, the ratio of the thickness t1 of the web 4 and the thickness t2 of the radial direction rib 11 (t1:t2) is 3.5:1 (when the thickness t1 of the web 4 is 3.5 mm, the thickness t2 of the radial direction rib 11 is 1 mm). The flow of molten resin flowing through the section within the cavity 12 corresponding to the web 4 is more effectively narrowed at the section corresponding to the radial direction ribs 11. The flow of molten resin within the cavity 12 is restricted so as to delay the period during which the section corresponding with the radial direction ribs 11 within the cavity 12 is filled with the molten resin from the period according to the above-described embodiment (see FIG. 5). In the worm wheel 1 according to the present variation example, compared to when the thickness t1 of the web 4 is 3.5 mm and the thickness t2 of the radial direction rib 11 is 2 mm, the number of radial direction ribs 11 is increased by 1.5 times (the circumferential direction pitch of the radial direction rib 11 is narrowed) and the capacity of the small spaces (lightening sections) 10 between adjacent radial direction ribs 11 and 11 is reduced. In this way, the number of radial direction ribs 11 can be increased by the amount of reduction in the thickness of the radial direction rib 11, from 2 mm to 1 mm, thereby restricting the flow of molten resin within the cavity 12 without reducing the strength of the worm wheel 1 (see FIG. 5).

In the worm wheel 1 according to the present variation example such as this, the amount of distortion deformation and the amount of creep deformation of the rim due to influence from the meshing load during power transmission can be reduced, as in the worm wheel 1 according to the above-described embodiment. The reduction in gear accuracy can be suppressed. The occurrence of noise attributed to molten-liquid-induced creases and welding marks during meshing with the mating gear (worm) can be prevented.

The numerical examples indicated in the present variation example indicate an example of the present invention. The present invention is not limited by the present variation example in any way. For example, the ratio of the thickness t1 of the web 4 and the thickness t2 of the radial direction rib 11 is set to an optimum ratio between the range of $t1>t2>tx$ (thickness measurement at which the injection molding is possible depending on the resin material; when the resin material is polyacetal, the thickness is confirmed to be about 0.5 mm), as long as the flow of molten resin within the cavity can be restricted (see FIG. 5) and the same effects as in those according to the above-described embodiment and each variation example can be achieved.

Figure 11:
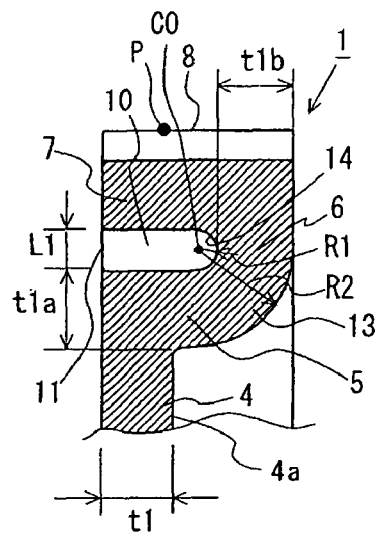
FIG. 11 is a diagram of a relationship between the thickness of a web, the thickness of a first overhanging section, and the thickness of a second overhanging section, corresponding to FIG. 2B.

According to the above-described embodiment and respective variation examples, the thicknesses of the web 4, the first overhanging section 5, and the second overhanging section 6 are indicated to have the same measurement, t1. However, the present invention is not limited to the embodiment and respective variation examples (see FIG. 2A). In other words, in the present invention, the thickness t1a of the first overhanging section 5 and the thickness t1b of the second overhanging section 6 can differ from the thickness t1 of the web 4, as shown in FIG. 11, as long as the flow of molten resin within the cavity 12 can be restricted as in the above-described embodiment and each variation example.

INDUSTRIAL APPLICABILITY

The present invention is not limited to an injection-molded worm wheel and can be widely applied to plastic injection-molded gears, such as screw gears and helical gears.

What is claimed is:
1. A plastic injection-molded gear in which a rim, on which teeth are formed, is disposed on an outer peripheral side of a web, the plastic injection-molded gear comprising:
    said web;
    a first overhanging section formed so as to project from only one side surface of an outer peripheral edge of the web in a cantilevered manner and substantially shaped into a ring with a central axis of rotation as a center;
    a second overhanging section extending only from a tip of the projection direction of the first overhanging section in an outward radial direction of the web;
    the rim on which the teeth are formed is on an outer periphery thereof, the rim extending only from an edge of the second overhanging section in a direction opposite of a projection direction of the first overhanging section and having a substantially ring-shaped portion that is concentric with the first overhanging section; and
    a plurality of radial direction ribs connecting an outer periphery of the first overhanging section and an inner periphery of the rim in a radial direction, so as to divide a substantially ring-shaped space surrounded by the first overhanging section, the second overhanging section, and the rim into a plurality of small spaces in an outer circumferential direction, wherein:
    a connection position between the second overhanging section and the rim is located displaced from a meshing position of the teeth in a teeth width direction,
    thicknesses of the web, the first overhanging section, and the second overhanging section are substantially equal,
    a thickness of the radial direction rib is thinner than the thickness of the web by, during injection molding of the gear, a narrowed flow of resin moving from the web in the outward radial direction and by preferential lead of the flow of the resin from the web to the rim side via the first and second overhanging sections compared to a flow of the resin moving to the rim side via the radial direction ribs, and
    the plastic gear is injection-molded as a single piece of a single unitary construction.
2. The plastic injection-molded gear according to claim 1, wherein a thickness of a corner section serving as a connecting section between the first overhanging section and the second overhanging section is substantially equal to the thicknesses of the first overhanging section and the second overhanging section.
3. The plastic injection-molded gear according to claim 1, wherein a corner section serving as a connection section between the first overhanging section and the second overhanging section is formed into a circular arc.

4. The plastic injection-molded gear according to claim 1, wherein a corner section serving as a connection section between the first overhanging section and the second overhanging section is formed into a circular arc having a thickness substantially equal, to the thicknesses of the first overhanging section and the second overhanging section.

\* \* \* \* \*